(12) United States Patent
Tang

(10) Patent No.: US 10,306,628 B2
(45) Date of Patent: *May 28, 2019

(54) METHOD AND APPARATUS FOR DETERMINING CONTROL CHANNEL SEARCH SPACE

(71) Applicant: Huawei Technologies Co., Ltd., Shenzhen, Guangdong (CN)

(72) Inventor: Zhenfei Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/624,664

(22) Filed: Jun. 15, 2017

(65) Prior Publication Data

US 2017/0290010 A1 Oct. 5, 2017

Related U.S. Application Data

(63) Continuation of application No. 14/699,679, filed on Apr. 29, 2015, now Pat. No. 9,699,783, which is a
(Continued)

(51) Int. Cl.
*H04L 5/00* (2006.01)
*H04W 72/04* (2009.01)
(Continued)

(52) U.S. Cl.
CPC ....... *H04W 72/0446* (2013.01); *H04L 5/0053* (2013.01); *H04W 48/16* (2013.01); *H04L 5/0007* (2013.01); *H04W 48/12* (2013.01)

(58) Field of Classification Search
CPC .............. H04W 72/0446; H04W 72/04; H04L 5/0053; H04L 5/0007
See application file for complete search history.

(56) References Cited

U.S. PATENT DOCUMENTS

| 5,375,123 A | 12/1994 | Andersson et al. |
| 5,722,078 A | 2/1998 | Przelomiec et al. |

(Continued)

FOREIGN PATENT DOCUMENTS

| CN | 102378269 A | 3/2012 |
| CN | 102469048 A | 5/2012 |

(Continued)

OTHER PUBLICATIONS

"3rd Generation Partnership Project; Technical Specification Group Radio Access Network; Evolved Universal Terrestrial Radio Access (E-UTRA); Physical layer procedures (Release 11)", 3GPP TS 36.213 V11.1.0, Dec. 2012, pp. 112-114.
(Continued)

*Primary Examiner* — Lan-Huong Truong

(57) ABSTRACT

Embodiments of the present disclosure provide a method for determining a control channel search space. The method includes: determining numbers of at least two physical resource sets; determining, according to the numbers, location offsets of search spaces corresponding to the at least two physical resource sets, wherein the determined location offsets of the search spaces comprises at least two different location offsets of the search spaces; and determining, according to the location offsets of the search spaces corresponding to the at least two physical sets, the search spaces corresponding to the at least two physical resource sets. By grouping and numbering resources, and determining different location offsets for different search spaces, a probability of control channel search space conflict can be reduced. Thereby, resources of control channels can be maximized in a case of multiple users, and communication efficiency can be improved.

9 Claims, 6 Drawing Sheets

Related U.S. Application Data continuation of application No. PCT/CN2012/083938, filed on Nov. 1, 2012.

(51) Int. Cl.
*H04W 48/16* (2009.01)
*H04W 48/12* (2009.01)

(56) References Cited

U.S. PATENT DOCUMENTS

| | | |
|---|---|---|
| 9,191,181 B2 | 11/2015 | Joung et al. |
| 2012/0047194 A1 | 2/2012 | Stergiou et al. |
| 2013/0028108 A1 | 1/2013 | Wu et al. |
| 2013/0083750 A1 | 4/2013 | Nazar et al. |
| 2013/0100901 A1 | 4/2013 | Shan et al. |
| 2013/0107822 A1* | 5/2013 | Papasakellariou .... H04L 5/0053 370/329 |
| 2013/0183987 A1 | 7/2013 | Vrzic et al. |
| 2013/0242882 A1* | 9/2013 | Blankenship ....... H04W 72/042 370/329 |
| 2015/0078277 A1 | 3/2015 | Seo et al. |

FOREIGN PATENT DOCUMENTS

| | | |
|---|---|---|
| JP | 2012043431 A | 3/2012 |
| JP | 2015508956 A | 3/2015 |
| RU | 2190939 C2 | 10/2002 |
| WO | 2010147435 A2 | 12/2010 |
| WO | 2010150137 A1 | 12/2010 |
| WO | 2011120278 A1 | 10/2011 |
| WO | 2012149456 A1 | 11/2012 |
| WO | 2013112972 A1 | 8/2013 |
| WO | 2013154279 A1 | 10/2013 |

OTHER PUBLICATIONS

"3rd Generation Partnership Project; Technical Specification Group Radio Access Network; Evolved Universal Terrestrial Radio Access (E-UTRA); Physical layer procedures (Release 11)", 3GPP TS 36.213 V11.4.0, Sep. 2013, pp. 126-132.

Interdigital Communications, LLC, "Remaining details of EPDCCH search space design", 3GPP TSG RAN WG1 Meeting #70bis, R1-124266, Oct. 8-12, 2012, 5 pages.

Huawei et al., "EPDCCH search space design", 3GPP TSG RAN WG1 Meeting #71, R1-125153, Nov. 12-16, 2012, 9 pages.

Huawei et al., "Finalization of implementation of Yk and text proposal", 3GPP TSG RAN WG1 Meeting #72, R1-130007, Jan. 28-Feb. 1, 2013, 5 pages.

Interdigital Communications, LLC, "Final details of EPDCCH hashing function", 3GPP TSG RAN WG1 Meeting #72, , R1-130227, Jan. 28-Feb. 1 , 2013, 5 pages.

Panasonic et al., "Way forward proposal on BD split for EPDCCH", 3GPP TSG RAN WG1 Meeting #70bis, R1-124660, Oct. 8-12, 2012, 1 page.

Panasonic, "EPDCCH-PUCCH resource allocation for TDD", 3GPP TSG-RAN WG1 Meeting #70bis, R1-124244, Oct. 8-12, 2012, 4 pages.

Motorola Mobility, "Blind Decoding and Search Space configuration for EPDCCH", 3GPP TSG RAN WG1 #70bis, R1-124457, Oct. 8-12, 2012, 5 pages.

Panasonic, "EPDCCH search space and aggregation levels", 3GPP TSG RAN WG1 Meeting #70bis, R1-124241, Oct. 8-12, 2012, 6 pages.

Panasonic, "Remaining issues on PUCCH resource allocation for EPDCCH", 3GPP TSG-RAN WG1 Meeting #70bis, R1-124243, Oct. 8-12, 2012, 7 pages.

"3rd Generation Partnership Project; Technical Specification Group Radio Access Network; Evolved Universal Terrestrial Radio Access (E-UTRA); Physical layer procedures(Release 11)", 3GPP TS 36.213 V11.0.0, Sep. 2012, 143 pages.

Motorola Mobility, "Configuration of EPDCCH" 3GPP TSG RAN WG1 #70, Aug. 13, 2012-Aug. 18, 2012, QingDao, P. R. China, 6 pages, R1-123788.

3rd Generation Partnership Project; Technical Specification Group Radio Access Network; Evolved Universal Terrestrial Radio Access (E-UTRA); Physical layer procedures (Release 10), 3GPP TS 36.213 V10.7.0 (Sep. 2012), 126 pages.

Anxin Li et al., "Search Space Design for Cross-Carrier Scheduling in Carrier Aggregation of LTE-Advanced System", This full text paper was peer reviewed at the direction of IEEE Communications Society subject matter experts for publication in the IEEE ICC 2011 proceedings, 5 pages.

Xiaoli Chen et al., "RNTI Allocation Schemes for User Equipments in LTE System", 2012 IEEE, 4 pages.

* cited by examiner

METHOD AND APPARATUS FOR DETERMINING CONTROL CHANNEL SEARCH SPACE

CROSS REFERENCE TO RELATED APPLICATION

This application is a continuation of U.S. patent application Ser. No. 14/699,679, filed on Apr. 29, 2015, which is a continuation of International Application No. PCT/CN2012/083938, filed on Nov. 1, 2012. All of the afore-mentioned patent applications are hereby incorporated by reference in their entireties.

TECHNICAL FIELD

Embodiments of the present disclosure relate to the communications field, and specifically, to a method and an apparatus for determining a control channel search space.

BACKGROUND

An orthogonal frequency division multiplexing technology (OFDM) is a system key multiple access technology of beyond third generation (B3G)/the fourth generation (4G) mobile communications systems, and is also a downlink multiple access technology used by Long Term Evolution (LTE)/LTE Advanced (LTE-A) systems.

In terms of time, a length of an OFDM radio frame is 10 ms, including 10 subframes. A length of each subframe is 1 ms, each subframe includes two timeslots, and each timeslot includes seven or six OFDM symbols. In terms of frequency, one OFDM radio frame includes multiple subcarriers. A subcarrier in an OFDM symbol is referred to as a resource element (RE), four REs form a resource element group (REG), nine REGs form a control channel element (CCE), and 12 subcarriers and one timeslot form a resource block (RB). RBs are classified into physical resource blocks (PRB) and virtual resource blocks (VRB); a PRB refers to an actual frequency location of an RB, and PRBs are numbered in ascending order; two PRBs form a PRB pair; a numbering form different from that for PRBs is used for VRBs, to map VRBs to PRBs by using a specific resource allocation manner. Various control information, reference signals or service data is transmitted on these time frequency resources.

A physical downlink control channel (PDCCH) is a channel that is defined in LTE Release-8/Release-9/Release-10. The PDCCH bears downlink control information (DCI). The DCI includes scheduling information, power control information, and the like, of a downlink data channel or an uplink data channel. In the prior art, an evolved Node B (eNB) may determine a search space of the PDCCH according to an aggregation level, and an user equipment (UE) obtains, by searching, an effective PDCCH in the determined search space. The PDCCH has four aggregation levels, which are 1, 2, 4, and 8 respectively, and indicates respectively that the PDCCH is mapped to one, two, four, and eight CCEs. One aggregation level corresponds to a search space size and the number of PDCCH candidates, that is, a possible PDCCH location that one PDCCH may be mapped to.

An enhanced physical downlink control channel (EPDCCH) is further introduced to LTE Release-11. The EPDCCH occupies physical resources of a data channel, and is multiplexed with the data channel in a frequency division multiplexing manner. The number of resources that are occupied by an EPDCCH is notified to a UE by higher layer or physical layer signaling. The eNB allocates one or more groups of time frequency resources for EPDCCHs in a search space, where one group of physical resources is referred to as an EPDCCH set. An aggregation level of an EPDCCH determines the number of enhanced control channel elements (eCCE) that are occupied by the EPDCCH. Transmission solutions of EPDCCHs may be classified into localized transmission and distributed transmission according to whether resources used by the EPDCCHs are continuous in the frequency domain. The search space determining manner in the prior art causes that multiple EPDCCH sets or UEs use a same search space, which leads to, when the number of users increases, a serious control channel congestion phenomenon and an obvious search space conflict phenomenon.

SUMMARY

For the foregoing problem, embodiments of the present disclosure provide a method and an apparatus for determining a control channel search space, which can reduce a conflict probability of control channel search spaces.

According to a first aspect, a specific implementation is: a method for determining a control channel search space is proposed, including: determining numbers of at least two EPDCCH sets used for enhanced physical downlink control channel EPDCCH transmission; determining, according to the numbers of the EPDCCH sets, location offsets of search spaces corresponding to the EPDCCH sets; and determining, according to the location offsets of the search spaces corresponding to the EPDCCH sets, the search spaces corresponding to the EPDCCH sets.

In a first possible implementation manner, with reference to the first aspect: the determining numbers of at least two EPDCCH sets used for enhanced physical downlink control channel EPDCCH transmission includes: determining a first number of a first EPDCCH set used for EPDCCH transmission and a second number of a second EPDCCH set used for EPDCCH transmission.

In a second possible implementation manner, with reference to the first aspect or the first possible implementation manner of the first aspect, a specific implementation is: the determining, according to the number of the EPDCCH sets, location offsets of search spaces corresponding to the EPDCCH sets includes: determining, according to the first number, a first location offset of a search space corresponding to the first EPDCCH set, or determining, according to the second number, a second location offset of a search space corresponding to the second EPDCCH set.

In a third possible implementation manner, with reference to the first aspect or the first possible implementation manner of the first aspect or the second possible implementation manner of the first aspect, a specific implementation is: the determining, according to the location offsets of the search spaces corresponding to the EPDCCH sets, the search spaces corresponding to the EPDCCH sets includes: determining, according to the first location offset, the search space corresponding to the first EPDCCH set; or determining, according to the second location offset, the search space corresponding to the second EPDCCH set; or determining, according to the first location offset, the search space corresponding to the second EPDCCH set.

According to a second aspect, a method for determining a control channel search space is provided, including: determining a first number of a first EPDCCH set or a second number of a second EPDCCH set, where the first EPDCCH set and the second EPDCCH set are used for EPDCCH transmission; determining, according to the first number, a first location offset of a search space corresponding to the first EPDCCH set; determining a first offset parameter; and determining a second location offset according to the first offset parameter and the first location offset; determining, according to the first location offset, the search space corresponding to the first EPDCCH set; and determining, according to the second location offset, a search space corresponding to the second EPDCCH set.

In a first possible implementation manner, with reference to the second aspect, the method further includes: the determining a first offset parameter includes: determining that the first offset parameter is an integer that is greater than 0 and less than 65538, or determining the first offset parameter according to a cell identity, or determining the first offset parameter according to a UE identifier.

In a second possible implementation manner, with reference to the second aspect or the first possible implementation manner of the second aspect, a specific implementation is: the first offset parameter is 39827.

In a third possible implementation manner, with reference to the second aspect or the first possible implementation manner of the second aspect, a specific implementation is: the determining the first offset parameter according to a cell identity includes: determining the first offset parameter according to the cell identity and the number of virtual resources in the second EPDCCH set, or according to the cell identity and the number of physical resources in the second EPDCCH set, or according to the cell identity and the number of virtual resources corresponding to a unit physical resource, or according to the cell identity and an EPDCCH transmission mode, or according to the cell identity and an EPDCCH aggregation level.

In a fourth possible implementation manner, with reference to the second aspect or the first possible implementation manner of the second aspect, a specific implementation is: the determining the first offset parameter according to a UE identifier includes: determining the first offset parameter according to the UE identifier and the number of virtual resources in the second EPDCCH set, or according to the UE identifier and the number of physical resources in the second EPDCCH set, or according to the UE identifier and the number of virtual resources corresponding to a unit physical resource, or according to the UE identifier and an EPDCCH transmission mode, or according to the UE identifier and an EPDCCH aggregation level.

In a fifth possible implementation manner, with reference to the second aspect, a specific implementation is: the determining the first parameter further includes: determining the first offset parameter according to the number of virtual resources in the second EPDCCH set, or according to the number of physical resources in the second EPDCCH set, or according to the number of virtual resources corresponding to a unit physical resource, or according to an EPDCCH transmission mode, or according to a cell identity and an EPDCCH aggregation level.

According to a third aspect, a method for determining a control channel search space is proposed, including: determining a first number of a first EPDCCH set or a second number of a second EPDCCH set, where the first EPDCCH set and the second EPDCCH set are used for EPDCCH transmission; determining, according to the first number, a first location offset of a search space corresponding to the first EPDCCH set; determining a first offset parameter; determining the search space of the first EPDCCH set according to the first location offset, and determining, according to the first location offset and the first offset parameter, a search space corresponding to a search space of the second EPDCCH set.

In a first possible implementation manner, with reference to the third aspect, the method further includes: for details about the determining a first offset parameter, refer to the method for determining a first offset parameter in the second aspect.

According to a fourth aspect, a method for determining a control channel search space is proposed, including: determining a first number of a first EPDCCH set or a second number of a second EPDCCH set, where the first EPDCCH set and the second EPDCCH set are used for EPDCCH transmission; determining a first parameter or a second parameter according to a number of the EPDCCH set; determining, according to the first parameter or the second parameter, a location offset of a search space corresponding to the EPDCCH set; and determining, according to the location offset of the search space corresponding to the EPDCCH set, the search space corresponding to the EPDCCH set.

In a first possible implementation manner, with reference to the fourth manner, the method further includes: the determining a first parameter or a second parameter includes: determining the first parameter according to a cell identity or a UE identifier; or determining the second parameter according to a cell identity or a UE identifier.

According to a fifth aspect, a method for determining a control channel search space is provided, including: determining a first number of a first EPDCCH set or a second number of a second EPDCCH set, where the first EPDCCH set and the second EPDCCH set are used for EPDCCH transmission; determining a second offset parameter according to a number of the EPDCCH set; determining, according to the second offset parameter, a location offset of a search space corresponding to the EPDCCH set; and determining, according to the location offset of the search space corresponding to the EPDCCH set, the search space corresponding to the EPDCCH set.

In a first possible implementation manner, with reference to the fifth manner, the method further includes: the determining a second offset parameter includes: determining the second offset parameter according to a cell identity or a UE identifier.

According to a sixth aspect, a method for determining a control channel search space is proposed, including: determining a location offset of a search space corresponding to an EPDCCH set according to information in downlink control information, or a physical random access channel preamble identifier, or information in random access response grant, or information in a message 3 that is used for random access.

According to a seventh aspect, an apparatus for determining a control channel search space is proposed, including: a number determining unit, configured to determine numbers of at least two EPDCCH sets used for enhanced physical downlink control channel EPDCCH transmission; an offset determining unit, configured to determine, according to the numbers of the EPDCCH sets, location offsets of search spaces corresponding to the EPDCCH sets; and a search space determining unit, configured to determine, according to the location offsets of the search spaces corresponding to the EPDCCH sets, the search spaces corresponding to the EPDCCH sets.

In a first possible implementation manner, with reference to the seventh aspect, the apparatus further includes: the number determining unit is specifically configured to: determine a first number of a first EPDCCH set used for EPDCCH transmission and a second number of a second EPDCCH set used for EPDCCH transmission.

In a second possible implementation manner, with reference to the seventh aspect or the first possible implementation manner of the seventh aspect, a specific implementation is: the offset determining unit includes: a first offset determining subunit, configured to determine, according to the first number, a first location offset of a search space corresponding to the first EPDCCH set; and/or a second offset determining subunit, configured to determine, according to the second number, a second location offset of a search space corresponding to the second EPDCCH set; and/or a first offset parameter determining unit, configured to determine a first offset parameter; and/or a second offset parameter determining unit, configured to determine a first parameter or a second parameter or a second offset parameter.

In a third possible implementation manner, with reference to the seventh aspect or the first possible implementation manner of the seventh aspect or the second possible implementation manner of the seventh aspect, a specific implementation is: the search space determining unit is specifically configured to: determine, according to the first location offset, the search space corresponding to the first EPDCCH set; or determine, according to the second location offset, the search space corresponding to the second EPDCCH set; or determine, according to the first location offset, the search space corresponding to the second EPDCCH set.

In a fourth possible implementation manner, with reference to the seventh aspect, a specific implementation is: the offset determining unit is specifically configured to: determine a first offset location; determine a first offset parameter; and determine a second location offset according to the first offset parameter and the first location offset.

In a fifth possible implementation manner, with reference to the seventh aspect or the second possible implementation manner of the seventh aspect, a specific implementation is: the first offset parameter determining unit is specifically configured to: determine the first offset parameter from integers within a range greater than 0 and less than 65538; or determine the first offset parameter according to a cell identity; or determine the first offset parameter according to a UE identifier.

In a sixth possible implementation manner, with reference to the seventh aspect or the second possible implementation manner of the seventh aspect, a specific implementation is: the offset determining unit includes: a second offset parameter determining unit, configured to determine a first parameter $A^{(c)}$ or a second parameter $D^{(c)}$ or a second offset parameter $r^{(c)}$ according to the number of the EPDCCH set.

In a seventh possible implementation manner, with reference to the seventh aspect or the sixth possible implementation manner of the seventh aspect, a specific implementation is: the offset determining unit is specifically configured to: determine, according to the first parameter $A^{(c)}$ or the second parameter $D^{(c)}$, the location offset of the search space corresponding to the EPDCCH set; or determine, according to the second offset parameter $r^{(c)}$, the location offset of the search space corresponding to the EPDCCH set.

In an eighth possible implementation manner, with reference to the seventh aspect or the third possible implementation manner of the seventh aspect, a specific implementation is: the search space determining unit further includes: a first offset parameter determining unit, configured to determine the first offset parameter; and a search space determining subunit, configured to determine, according to the first location offset and the first offset parameter, the search space corresponding to the second EPDCCH set.

In a ninth possible implementation manner, with reference to the seventh aspect or the second possible implementation manner of the seventh aspect, a specific implementation is: the offset determining unit is specifically configured to: determine the location offsets of the search spaces corresponding to the EPDCCH sets according to information in downlink control information, or a physical random access channel preamble identifier, or information in random access response grant, or information in a message 3 used for random access.

According to an eighth aspect, an apparatus for determining a control channel search space is proposed, including: a memory, configured to store numbers of EPDCCH sets used for enhanced physical downlink control channel EPDCCH transmission; determine, according to the numbers of the EPDCCH sets, location offsets of search spaces corresponding to the EPDCCH sets; and determine, according to the location offsets of the search spaces corresponding to the EPDCCH sets, code that is required by the search spaces corresponding to the EPDCCH sets; and a processor, configured to execute the code in the memory.

Based on the foregoing technical solutions, by grouping and numbering time frequency resources of EPDCCHs, and determining different location offsets for different EPDCCH search spaces according to the numbers, the method and the apparatus for determining a control channel search space provided by the embodiments herein can reduce a probability of control channel search spaces conflict.

According to yet another aspect, there is provided a method for determining a control channel search space at a communication device when at least two physical resource sets are configured for downlink control channel transmission. The method includes determining numbers of the at least two physical resource sets, and determining, according to the numbers of the at least two physical resource sets, location offsets of search spaces corresponding to the at least two physical resource sets, wherein the determined location offsets of the search spaces comprises at least two different location offsets of the search spaces. The method also includes determining, according to the location offsets of the search spaces corresponding to the at least two physical sets, the search spaces corresponding to the at least two physical resource sets.

According to yet another aspect, there is provided a device including a memory and a processor, wherein the processor is configured to determine numbers of the at least two physical resource sets, determine, according to the numbers of the at least two physical resource sets, location offsets of search spaces corresponding to the at least two physical resource sets, wherein the determined location offsets of the search spaces comprises at least two different location offsets of the search spaces, and determine, according to the location offsets of the search spaces corresponding to the at least two physical sets, the search spaces corresponding to the at least two physical resource sets.

BRIEF DESCRIPTION OF THE DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
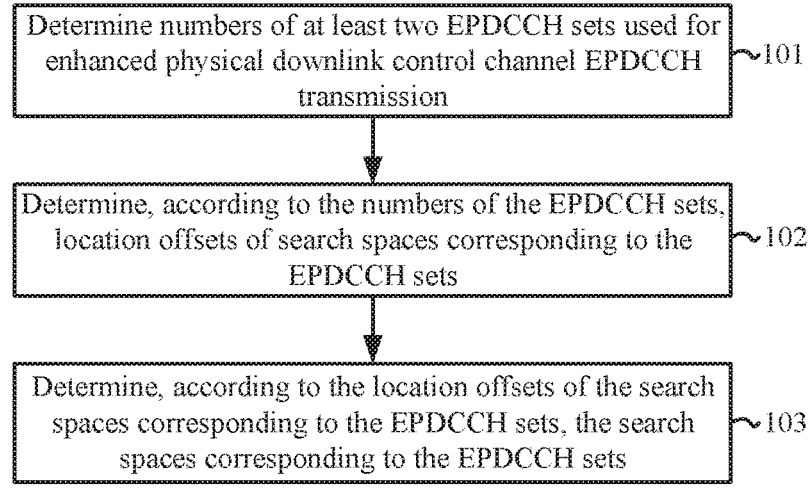
FIG. 1 is a schematic flowchart of a method for determining a search space according to an embodiment of the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are apart rather than all of the embodiments of the present disclosure. All other embodiments obtained by a person of ordinary skill in the art based on the embodiments of the present disclosure without creative efforts shall fall within the protection scope of the present disclosure.

It should be understood that, the technical solutions of the embodiments of the present disclosure may be applied to various communications systems, such as: a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, and a Universal Mobile Telecommunications System (UMTS).

It should also be understood that in the embodiments of the present disclosure, a user equipment (UE) may be referred to as a terminal, a mobile station (MS), a mobile terminal, and the like. The user equipment may communicate with one or more core networks through a radio access network (RAN). For example, the user equipment may be a mobile phone (also referred to as a "cellular" phone) or a computer with a mobile terminal. For example, the user equipment may also be a portable, pocket-sized, handheld, computer built-in, or in-vehicle mobile apparatus, which exchanges voice and/or data with the radio access network.

In the embodiments of the present disclosure, a base station maybe abase station (BTS) in GSM or CDMA, may also be abase station (NB) in WCDMA, and may further be an evolved NodeB (eNB or e-NodeB) in LTE, which is not limited in the present disclosure. However, for convenient description, a base station (eNB) and a user equipment (UE) are used as examples to illustrate the following embodiments.

It should also be understood that in the embodiments of the present disclosure, a control channel may include other physical layer control channels, such as a PDCCH and an EPDCCH, but for ease of description, only an EPDCCH is used as an example to illustrate the embodiments of the present disclosure, and the embodiments of the present disclosure are not limited thereto. The EPDCCH set in the present disclosure is a group of physical resources that are configured by an eNB for a specific UE and that support EPDCCH transmission. The cell identity in the present disclosure includes a physical cell identity or a virtual cell identity, where a physical cell identity is obtained by a UE from a synchronization channel, and a virtual cell identity is obtained by a UE from RRC information that is configured by an eNB. The search space in the present disclosure includes a UE-specific search space or a common search space.

FIG. 1 is a schematic flowchart of a method for determining a search space according to an embodiment of the present disclosure. The method in FIG. 1 may be executed by a base station or a UE.

101. Determine numbers of at least two EPDCCH sets used for EPDCCH transmission.

More than two groups of time frequency resources are allocated to EPDCCHs in a user level search space, where one group of time frequency resources is referred to as an EPDCCH set. Each EPDCCH set corresponds to one EPDCCH set number, and the EPDCCH set number corresponding to each EPDCCH set is different. For example, a number of an EPDCCH set is c, and c is a non-negative integer that is less than N, where N is the number of EPDCCH sets that are configured for a search space of a UE. It should be understood that, the number is not limited to a numeral but may be any symbols, characters, information and the like that can be used for identification.

102. Determine, according to the numbers of the EPDCCH sets, a location offsets of search spaces corresponding to the EPDCCH set.

Different EPDCCH sets are made to correspond to different location offsets according to the numbers and other identification information.

103. Determine, according to the location offset of the search space corresponding to the EPDCCH set, the search space corresponding to the EPDCCH set.

Based on the foregoing technical solution, by grouping and numbering time frequency resources of EPDCCHs, and determining different location offsets for different EPDCCH search spaces according to numbers, the embodiment of the present disclosure can reduce a probability of control channel search space conflict.

Optionally, in an embodiment, in step 102, a location offset of a search space corresponding to a first EPDCCH set may be determined according to a number of the first EPDCCH set, or a location offset of a search space corresponding to a second EPDCCH set may be determined according to a number of the second EPDCCH set, or the location offset of the search space corresponding to the second EPDCCH set may be determined according to the number of the first EPDCCH set, or location offsets of search spaces corresponding to the two EPDCCH sets may be determined at the same time according to the numbers of the two EPDCCH sets.

$Y_k^{(c)}$ (is the location offset of the search space corresponding to the EPDCCH set, and $Y_k^{(c)}$ may be obtained according to the following formula:

$$Y_k^{(c)} = (A \cdot Y_{k-1}^{(c)}) \bmod D$$

where $Y_{-1} = n_{RNTI} \neq 0$, $A=39827$, $D=65537$, $k = \lfloor n_s/2 \rfloor$, $\lfloor \ \rfloor$ is a round-down operation, $n_{RNTI}$ is a UE identifier, and $n_s$ is a timeslot number.

According to the foregoing formula, the location offset of the search space corresponding to the first EPDCCH set may be determined, an intermediate variable is determined, and the location offset of the search space corresponding to the second EPDCCH set may be determined by using the intermediate variable and the location offset of the search space corresponding to the first EPDCCH set.

Alternatively, according to the foregoing formula, the location offsets of the search spaces corresponding to the two EPDCCH sets are determined at the same time by changing a constant in the foregoing formula or assigning a new variable to the foregoing formula.

Optionally, in an embodiment, in step 103, the search space corresponding to the EPDCCH set may be determined according to the following formula:

$$L\{(Y_k + m') \bmod \lfloor N_{eCCE,k}/L \rfloor\} + i$$

where L is an aggregation level (Aggregation Level); $Y_k$ is a location offset of a search space, which is also referred to as a start location of a search space; for a common search space, m'=m, and for a user-specific search space, if a user configures a carrier indicator field, $m' = m + M^{(L)} \cdot n_{CI}$, where $n_{CI}$ is a value of the carrier indicator field, and if the user does not configure the carrier indicator field, m'=m, where m=0, ..., $M^{(L)}-1$ and $M^{(L)}$ is the number of EPDCCHs; $N_{eCCE,k}$ is the total number of eCCEs in a control area of a subframe k; mod is a modulo operation; and i=0, ..., L−1.

The search space corresponding to the first EPDCCH set may be determined according to the location offset of the search space corresponding to the first EPDCCH set, and the search space corresponding to the second EPDCCH set may further be determined according to the location offset of the search space corresponding to the second EPDCCH set. The foregoing two steps may be performed separately, or performed at the same time without order limited. Alternatively, an intermediate variable may be determined, and the location offset of the search space corresponding to the second EPDCCH set is directly determined according to the intermediate variable and the location offset of the search space corresponding to the first EPDCCH set.

Therefore, by grouping and numbering time frequency resources of EPDCCHs, and determining different location offsets for different EPDCCH search spaces according to numbers, the method for determining a control channel search space provided by the present disclosure can effectively reduce a probability of control channel search space conflict. Thereby, time frequency resources of control channels can be maximized in a case of multiple users, and communication efficiency can be improved.

Figure 2:
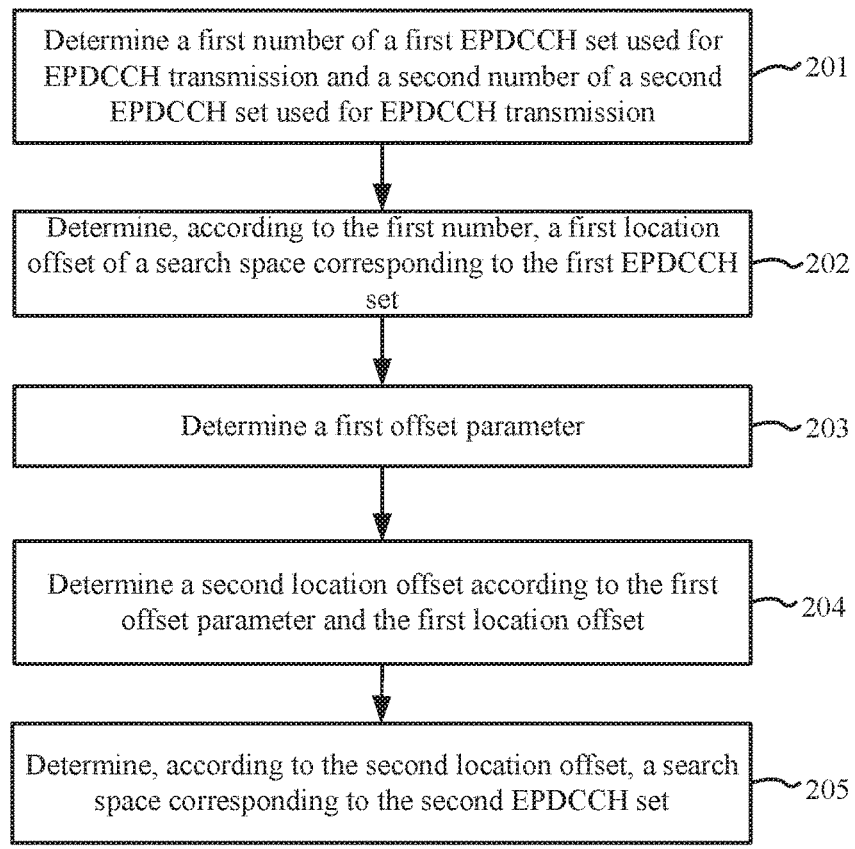
FIG. 2 is a schematic flowchart of a method for determining a search space according to another embodiment of the present disclosure.

FIG. 2 is a schematic flowchart of a method for determining a search space according to still another embodiment of the present disclosure. The method in FIG. 2 may be executed by a base station or a UE. FIG. 2 is a more specific embodiment of FIG. 1, and gives a specific method for determining a location offset of an EPDCCH set, and a specific method for determining a search space according to a location offset.

201. Determine a first number of a first EPDCCH set and a second number of a second EPDCCH set, where the first EPDCCH set and the second EPDCCH set are used for EPDCCH transmission.

More than two groups of time frequency resources are allocated to EPDCCHs in a user level search space, where one group of time frequency resources is referred to as an EPDCCH set. Each EPDCCH set corresponds to one EPDCCH set number, and the EPDCCH set number corresponding to each EPDCCH set is different. For example, a number of an EPDCCH set is c, and c is a non-negative integer that is less than N, where N is the number of EPDCCH sets that are configured for a search space of a UE. It should be understood that, the number is not limited to a numeral but may be any symbols, characters, information and the like that can be used for identification. Two EPDCCH sets are used as an example in this embodiment, where a number of the first EPDCCH set is 0, and a number of the second EPDCCH set is 1.

202. Determine, according to the first number, a first location offset of a search space corresponding to the first EPDCCH set.

The first location offset $Y_k^{(0)}$ may be obtained according to the following formula:

$$Y_k^{(0)} = (A \cdot Y_{k-1}^{(0)}) \bmod D$$

where $Y_{-1}^{(0)} = n_{RNTI} \neq 0$, $A=39827$, $D=65537$, $k = \lfloor n_s/2 \rfloor$, $n_{RNTI}$ is a UE identifier, and $n_s$ is a timeslot number.

203. Determine a first offset parameter.

Set the first offset parameter be v, where v may be determined according to any one of the following methods: v is a fixed value; or the first offset parameter is determined according to a cell identity; or the first offset parameter is determined according to a UE identifier.

When the first offset parameter is a fixed value, a predefined value may be assigned to v, where the predefined value is an integer that is greater than 0 and less than 65538. The fixed value may be selected randomly or specified from the range. For example, the fixed value is 39827.

That the first offset parameter is determined according to a cell identity is a Cell-specific (Cell-specific) manner, where the Cell-specific manner includes at least one of the following manners:

v is determined by a cell ID (a physical cell ID or a virtual cell ID), for example, v=Cell_id or v=Cell_id mod B, where Cell_id is a cell ID and B is a predefined positive integer that is greater than 1 and less than 65537;

v is determined by a cell ID (a physical cell ID or a virtual cell ID) and the number of eCCEs in an EPDCCH set, for example, v=Cell_id mod $N_{eCCE}$, where Cell_id is a cell ID, and $N_{eCCE}$ is the number of eCCEs in the second EPDCCH set, where an eCCE is an enhanced control channel unit, and the number of eCCEs is determined by time frequency resources allocated to the EPDCCH set and an EPDCCH aggregation level;

v is determined by a cell ID (a physical cell ID or a virtual cell ID) and the number of physical resource block pairs in an EPDCCH set, for example, v=Cell_id mod $N_{PRB}$, where $N_{PRB}$ is the number of physical resource block pairs in the second EPDCCH set;

v is determined by a cell ID (a physical cell ID or a virtual cell ID) and the number of eCCEs in one physical resource block pair, for example, v=Cell_id mod $M_{eCCE}$, where $M_{eCCE}$ is the number of eCCEs in one physical resource block pair;

v is determined by a cell ID (a physical cell ID or a virtual cell ID) and an EPDCCH transmission mode, where, specifically, when EPDCCHs are transmitted in a localized transmission mode, v is determined by the cell ID and $B_0$, for example, v=Cell_id mod $B_0$, and when EPDCCHs are transmitted in a distributed transmission mode, v is determined by the cell ID and $B_1$, for example, v=Cell_id mod $B_1$, where $B_0$ and $B_1$ are any predefined values of positive integers from 1 to 65537; and v is determined by a cell ID (a physical cell ID or a virtual cell ID) and an EPDCCH aggregation level (that is, the number of eCCEs included in one EPDCCH), for example, v=Cell_id mod $L^{(1)}$, where $L^{(1)}$ is an aggregation level corresponding to an EPDCCH in the second EPDCCH set.

That the first offset parameter is determined according to a UE identifier is a UE-specific (UE-specific) manner, where the UE-specific manner includes at least one of the following manners:

v is determined by a UE RNTI, for example, v=G·$n_{RNTI}$ or v=$n_{RNTI}$ mod $B_1$, where $n_{RNTI}$ is a UE RNTI, and G and B are positive integers that are greater than 1 and less than 65536;

v is determined by a UE RNTI and a subframe number, for example, v=$n_{RNTI}$ or v=$n_{RNTI}$ mod B, where $n_{RNTI}$ is a UE RNTI, k is a subframe number, and B is a positive integer that is greater than 1 and less than 65536;

v is determined by a UE RNTI and the number of eCCEs in an EPDCCH set, for example, v=$n_{RNTI}$ mod $N_{eCCE}$, where $N_{eCCE}$ is the number of eCCEs in the second EPDCCH set;

v is determined by a UE RNTI and the number of physical resource block pairs in a EPDCCH set, for example, v=$n_{RNTI}$ mod $N_{PRB}$, where $N_{PRB}$ is the number of physical resource block pairs in the second EPDCCH set;

v is determined by a UE RNTI and the number of eCCEs in one physical resource block pair, for example, v=$n_{RNTI}$ mod $M_{eCCE}$, where $M_{eCCE}$ is the number of eCCEs in one physical resource block pair;

v is determined by a UE RNTI and an EPDCCH transmission mode, where, specifically, when EPDCCHs are transmitted in a localized transmission mode, v is determined by the UE RNTI and $B_0$, for example: v=$n_{RNTI}$ mod $B_0$; and when EPDCCHs are transmitted in a distributed transmission mode, v is determined by the UE RNTI and $B^1$, for example, v=$n_{RNTI}$ mod $B_1$, where $B_0$ and $B^1$ are any predefined values of positive integers from 1 to 65537;

v is determined by a UE RNTI and an EPDCCH aggregation level (that is, the number of eCCEs included in one EPDCCH), for example v=$n_{RNTI}$ mod $L^{(1)}$, where $L^{(1)}$ is an aggregation level corresponding to an EPDCCH in the second EPDCCH set;

v is determined by the number of eCCEs in an EPDCCH set, for example, v=A mod $N_{eCCE}$, where A is a prime number and $N_{eCCE}$ is the number of eCCEs in the second EPDCCH set, where an eCCE is an enhanced control channel element, and the number of eCCEs is determined by time frequency resources allocated to the EPDCCH set and an EPDCCH aggregation level;

v is determined by the number of physical resource block pairs in an EPDCCH set, for example, v=A mod $N_{PRB}$, where A is a prime number, and $N_{PRB}$ is the number of physical resource block pairs in the second EPDCCH set;

v is determined by the number of eCCEs in one physical resource block pair, for example, v=A mod $M_{eCCE}$, where A is a prime number, and $M_{eCCE}$ is the number of eCCEs in one physical resource block pair;

v is determined by an EPDCCH transmission mode, where, specifically, when EPDCCHs are transmitted in a localized transmission mode, v is determined by A and $B_0$, for example, v=A mod $B_0$; and when EPDCCHs are transmitted in a distributed transmission mode, v is determined by A and $B_1$, for example, v=A mod $B_1$, where A is a prime number, and $B_0$ and $B_1$ are any predefined values of positive integers from 1 to 65537; and v is determined by an EPDCCH aggregation level (that is, the number of eCCEs included in one EPDCCH), for example v=A mod $L^{(1)}$, where A is a prime number, and $L^{(1)}$ is an aggregation level corresponding to an EPDCCH in the second EPDCCH set.

204. Determine a second location offset according to the first offset parameter and the first location offset.

The second location offset may be determined according to any one of the following manners:

v is used as a relative offset value of two EPDCCH sets, for example, $Y_k^{(1)}=Y_k^{(0)}+v$, where $Y_k^{(0)}$ is a first location offset of the $k^{th}$ subframe, $Y_k^{(1)}$ is a second location offset of the $k^{th}$ subframe, and v is a first offset parameter; or v is used as a relative offset parameter of two EPDCCH sets, and the second location offset is defined by using a modulo operation, for example, $Y_k^{(1)}=(Y_k^{(0)}+v)$ mod D or $Y_k^{(1)}=(Y_k^{(0)}+v)$ mod (D−1) or $Y_k^{(1)}=(Y_k^{(0)}+v)$ mod(D−1)+1, where $Y_k^{(0)}$ is a first location offset of the $k^{th}$ subframe, $Y_k^{(1)}$ is a second location offset of the $k^{th}$ subframe, v is a first offset parameter, and D is an integer that is greater than 0 and less than 65538; or v is used as a relative offset parameter of two EPDCCH sets, and the second location offset is determined according to the number of eCCEs in an EPDCCH set, for example, $Y_k^{(1)}=(Y_k^{(0)}+v)$ mod $N_{eCCE}$, where $Y_k^{(0)}$ is a first location offset of the $k^{th}$ subframe, $Y_k^{(1)}$ is a second location offset of the $k^{th}$ subframe, v is a first offset parameter, and $N_{eCCE}$ is the number of eCCEs in the second EPDCCH set; or v is used as a relative offset parameter of two EPDCCH sets, and the second location offset is determined according to the number of physical resource block pairs in an EPDCCH set, for example, $Y_k^{(1)}=(Y_k^{(0)}+v)$ mod $N_{PRB}$ where $Y_k^{(0)}$ is a first location offset of the $k^{th}$ subframe, $Y_k^{(1)}$ is a second location offset of the $k^{th}$ subframe, v is a first offset parameter, and $N_{PRB}$ is the number of physical resource block pairs in the second EPDCCH set; or v is used as a relative offset parameter of two EPDCCH sets, and the second location offset is determined according to the number of eCCEs in one physical resource block pair, for example, $Y_k^{(1)}=(Y_k^{(0)}+v)$ mod $M_{eCCE}$, where $Y_k^{(0)}$ is a first location offset of the $k^{th}$ subframe, $Y_k^{(1)}$ is a second location offset of the $k^{th}$ subframe, v is a first offset parameter, and $M_{eCCE}$ is the number of eCCEs in one physical resource block pair; or a second location offset of the $k^{th}$ subframe is determined according a first location offset of the $(k-1)^{th}$ subframe, for example, $Y_k^{(1)}=(Y_{k-1}^{(0)}+v)$ mod D, where $Y_{-1}^{(0)}=n_{RNTI}\neq 0$, A=39827, D=65537, k=$\lfloor n_s/2 \rfloor$, $n_{RNTI}$ is a UE identifier, and $n_s$ is a timeslot number.

205. Determine, according to the first location offset, the search space corresponding to the first EPDCCH set, and determine, according to the second location offset, a search space corresponding to the second EPDCCH set.

The search space corresponding to the first EPDCCH set is determined according to the first location offset:

$$S_{k,0}^{(L)}: L\{(Y_k^{(0)}+m') \bmod \lfloor N_{eCCE,k}/L \rfloor\}+i$$

where L is an aggregation level (Aggregation Level); $Y_k^{(0)}$ is the first location offset; for a common search space, m'=m, and for a user-specific search space, if a user configures a carrier indicator field, m'=m+$M^{(L)}$·$n_{CI}$, where $n_{CI}$ is a value of the carrier indicator field, and if the user does not configure the carrier indicator field, m'=m, where m=0, . . . , $M^{(L)}$−1 and $M^{(L)}$ is the number of EPDCCHs; $N_{eCCE,k}$ is the total number of eCCEs in a control area of a subframe k; and i=0, . . . , L−1.

The search space corresponding to the second EPDCCH set is determined according to the second location offset:

$$S_{k,1}^{(L)}: L\{(Y_k^{(1)}+m')\bmod \lfloor N_{eCCE,k}/L\rfloor\}+i$$

where L is an aggregation level (Aggregation Level); $Y_k^{(1)}$ is the second location offset; for a common search space; m'=m, and for a user-specific search space, if a user configures a carrier indicator field, m'=m+$M^{(L)}$·$n_{CI}$ where $n_{CI}$ is a value of the carrier indicator field, and if the user does not configure the carrier indicator field, m'=m, where m=0, . . . , $M^{(L)}$−1 and $M^{(L)}$ is the number of EPDCCHs; $N_{eCCE}$ is the total number of eCCEs in a control area of a subframe k; and i=0, . . . , L−1.

Therefore, by grouping and numbering time frequency resources of EPDCCHs, and determining different location offsets for different EPDCCH search spaces according to the numbers, different cell identities or UE identifiers, and different EPDCCH resource allocation modes and transmission modes, the method for determining a control channel search space provided by the present disclosure can effectively reduce a probability of control channel search space conflict. Thereby, time frequency resources of control channels can be maximized in a case of multiple users, and communication efficiency can be improved.

Figure 3:
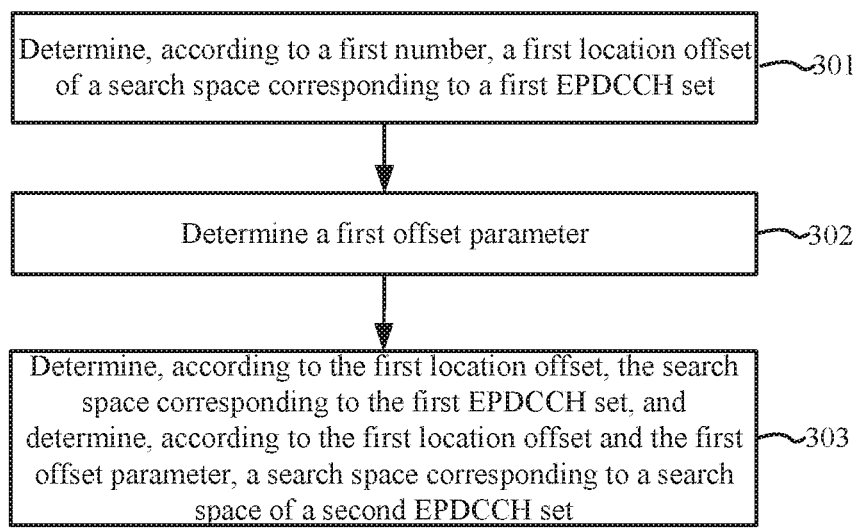
FIG. 3 is a schematic flowchart of a method for determining a search space according to another embodiment of the present disclosure.

FIG. 3 is a schematic flowchart of a method for determining a search space according to still another embodiment of the present disclosure. The method in FIG. 3 may be executed by a base station or a UE. FIG. 3 is another specific embodiment of FIG. 1, and a difference between FIG. 3 and FIG. 2 lies in the method of determining a search space, where, in FIG. 3, after a first location offset is determined, a second search space is directly determined according to the first location offset and a first offset parameter.

301. Determine, according to a first number, a first location offset of a search space corresponding to a first EPDCCH set.

This step is one circumstance of the foregoing step 201, that is, the first location offset of the search space corresponding to the first EPDCCH set is determined independently. A specific determining method has been described in step 201, and details are not described again.

302. Determine a first offset parameter.

For a specific determining method, refer to step 202, and details are not described again.

303. Determine, according to the first location offset, the search space corresponding to the first EPDCCH set, and determine a search space corresponding to a second EPDCCH set according to the first location offset and the first offset parameter.

The search space of the second EPDCCH set is directly determined according to the first location offset and the first offset parameter, so that a process of determining a second location offset parameter is skipped.

The search space of the first EPDCCH set is determined: $S_{k,0}^{(L)}: L\{(Y_k^{(0)}+m')\bmod \lfloor N_{eCCE,k}/L\rfloor\}+i$, and the search space of the second EPDCCH set is determined: $S_{k,1}^{(L)}: L\{(Y_k^{(1)}+m')\bmod \lfloor N_{eCCE,k}/L\rfloor\}+i$, where L is an aggregation level (Aggregation Level); $Y_k^{(0)}$ is the first location offset; v is the first offset parameter; for a common search space; m'=m, and for a user-specific search space, if a user configures a carrier indicator field, m'=m+$M^{(L)}$·$n_{CI}$ where $n_{CI}$ is a value of the carrier indicator field, and if the user does not configure the carrier indicator field, m'=m, where m=0, . . . , $M^{(L)}$−1 and $M^{(L)}$ is the number of EPDCCHs; $N_{eCCE,k}$ is the total number of eCCEs in a control area of a subframe k; and i=0, . . . , L−1.

Therefore, by grouping and numbering time frequency resources of EPDCCHs, and determining different location offsets for different EPDCCH search spaces according to the numbers, different cell identities or UE identifiers, and different EPDCCH resource allocation modes and transmission modes, the method for determining a control channel search space provided by the present disclosure can effectively reduce a probability of control channel search space conflict. Thereby, time frequency resources of control channels can be maximized in a case of multiple users, and communication efficiency can be improved.

Figure 4:
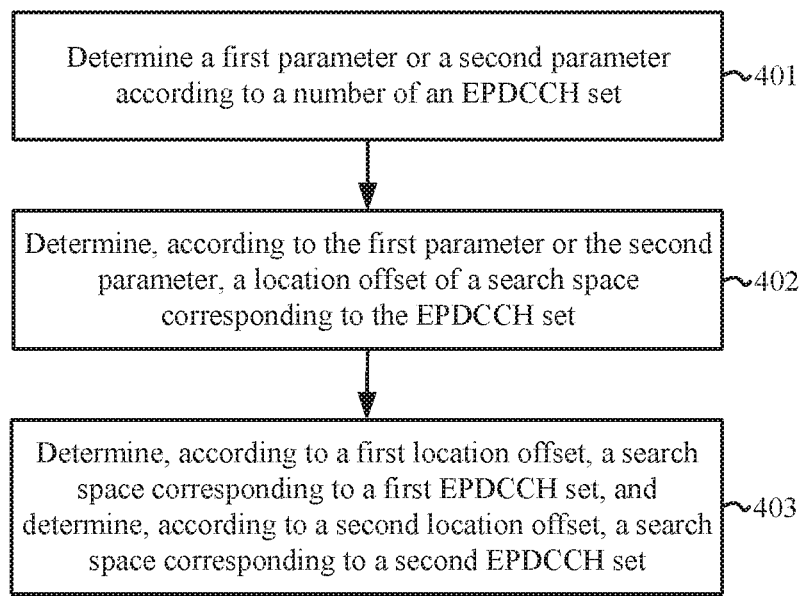
FIG. 4 is a schematic flowchart of a method for determining a search space according to another embodiment of the present disclosure.

FIG. 4 is a schematic flowchart of a method for determining a search space according to still another embodiment of the present disclosure. The method in FIG. 4 may be executed by a base station or a UE. FIG. 4 is a more specific embodiment of FIG. 1, where location offsets of EPDCCH sets are determined at the same time by determining an intermediate parameter.

401. Determine a first parameter or a second parameter according to a number of an EPDCCH set.

A value of the first parameter $A^{(c)}$ may be determined according to any one of the following manners:

the value of $A^{(c)}$ is determined in a predefining manner, for example, $A^{(0)}$=39827 and $A^{(1)}$=39829, where the value of $A^{(c)}$ is any one prime number that is greater than 1 and less than 65537, and includes but is not limited to any one of the following values: 39671, 39679, 39703, 39709, 39719, 39727, 39733, 39749, 39761, 39769, 39779, 39791, 39799, 39821, 39827, 39829, 39839, 39841, 39847, 39857, 39863, 39869, 39877, 39883, 39887, 39901, 39929, 39937, 39953, 39971, 39979, 39983, and 39989;

at least one $A^{(c)}$ value is determined according to a cell ID, for example $A^{(0)}$=39827, where when the cell ID is an odd number, $A^{(1)}$=39827, and when the cell ID is an even number, $A^{(1)}$=39829, or the other way round;

the value of $A^{(c)}$ is configured for a UE by using UE-specific higher layer signaling, for example, for UE 1, $A^{(0)}$=39827 and $A^{(1)}$=39829, and for UE 2, $A^{(0)}$=39839 and $A^{(1)}$=39841, where the value of $A^{(c)}$ is any one prime number that is greater than 1 and less than 65537, and includes but is not limited to any one of the following values: 39671, 39679, 39703, 39709, 39719, 39727, 39733, 39749, 39761, 39769, 39779, 39791, 39799, 39821, 39827, 39829, 39839, 39841, 39847, 39857, 39863, 39869, 39877, 39883, 39887, 39901, 39929, 39937, 39953, 39971, 39979, 39983, and 39989; and at least one $A^{(c)}$ value is determined according to a UE RNTI, for example $A^{(0)}$=39827, where when the UE RNTI is an odd number, $A^{(1)}$=39827, and when the UE RNTI is an even number, $A^{(1)}$=39829, or the other way round.

A value of the second parameter $D^{(c)}$ may be determined according to any one of the following manners:

the value of $D^{(c)}$ is determined in a predefining manner, for example, $D^{(0)}$=65269 and $D^{(1)}$=65287, where the value of $D^{(c)}$ is any one prime number that is greater than 1 and less than $2^{32}$, and includes but is not limited to any one of the following values: 65269, 65287, 65293, 65309, 65323, 65327, 65353, 65357, 65371, 65381, 65393, 65407, 65413, 65419, 65423, 65437, 65447, 65449, 65479, 65497, 65519, 65521, 65537, 65539, 65543, 65551, 65557, 65563, 65579, 65581, 65587, 65599, 65609, 65617, 65629, 65633, 65647, 65651, 65657, 65677, 65687, 65699, 65701, 65707, 65713, 65717, 65719, 65729, 65731, and 65761; and further, $D^{(c)}$ is UE-specific or Cell-specific, or the like, which has a same determining manner as the foregoing $A^{(c)}$, with only a different value range, where, for the value range, refer to the value range in the predefining manner of $D^{(c)}$, and details are not described again.

402. Determine, according to the first parameter or the second parameter, a location offset of a search space corresponding to the EPDCCH set.

The location offset of the search space corresponding to the EPDCCH set is determined according to any one of the following equations:

$$Y_k^{(c)} = (A^{(c)} \cdot Y_{k-1}^{(c)}) \bmod 65537 \text{ or } Y_k^{(c)} = (39827 \cdot Y_{k-1}^{(c)}) \bmod D^{(c)}$$

where c is the number of the EPDCCH set, $Y_k^{(c)}$ is a location offset of a search space corresponding to the EPDCCH set whose number is c in the $k^{th}$ subframe, $Y_{-1} = n_{RNTI} \neq 0$, $A=39827$, $D=65537$, $k = \lfloor n_s/2 \rfloor$, $n_{RNTI}$ is a UE identifier, and $n_s$ is a timeslot number.

403. Determine, according to a first location offset, a search space corresponding to a first EPDCCH set, and determine, according to a second location offset, a search space corresponding to a second EPDCCH set.

For a determining method, refer to step 205, and details are not described again.

Therefore, by grouping and numbering time frequency resources of EPDCCHs, and determining different location offsets for different EPDCCH search spaces according to the numbers and different cell identities or UE identifiers, the method for determining a control channel search space provided by the present disclosure can effectively reduce a probability of control channel search space conflict. Thereby, time frequency resources of control channels can be maximized in a case of multiple users, and communication efficiency can be improved.

Figure 5:
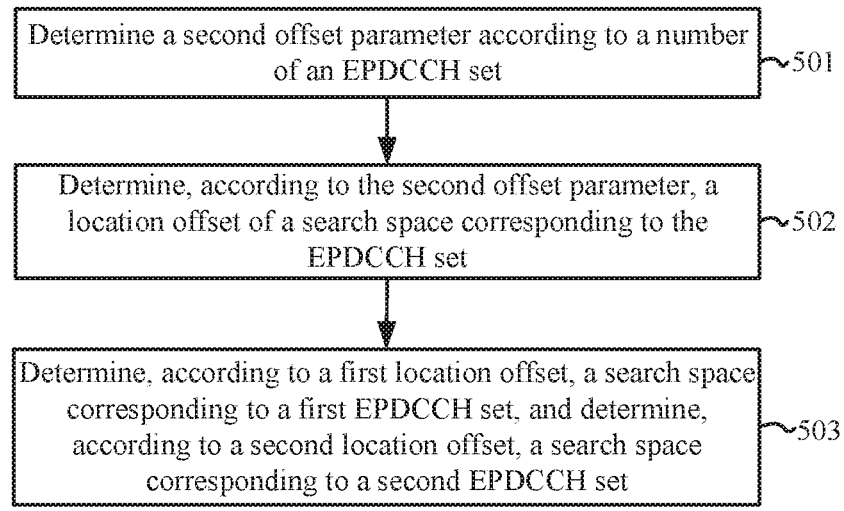
FIG. 5 is a schematic flowchart of a method for determining a search space according to another embodiment of the present disclosure.

FIG. 5 is a schematic flowchart of a method for determining a search space according to still another embodiment of the present disclosure. The method in FIG. 5 may be executed by a base station or a UE. FIG. 5 is a more specific embodiment of FIG. 1, where location offsets of EPDCCH sets are determined at the same time by determining an intermediate parameter, and a using method of the intermediate parameter is different from that in FIG. 4.

501. Determine a second offset parameter according to a number of an EPDCCH set.

A value of the second offset parameter $r^{(c)}$ may be determined according to any one of the following manners:

the value of $r^{(c)}$ is determined in a predefining manner, for example, $r^{(0)} = 39827$ and $r^{(1)} = 39829$, where the value of $r^{(c)}$ is any integer that is greater than 1 and less than 65537;

at least one $r^{(c)}$ value is determined according to a cell ID, for example $r^{(0)} = 39827$, where, when the cell ID is an odd number, $r^{(1)} = 39827$; and when the cell ID is an even number, $r^{(1)} = 39829$, or the other way round;

the value of $A^{(c)}$ is configured for a UE by using UE-specific higher layer signaling, for example, for UE 1, $A^{(0)} = 39827$ and $A^{(1)} = 39829$, and for UE 2, $A^{(0)} = 39839$ and $A^{(1)} = 39841$, where the value of $A^{(c)}$ is any integer that is greater than 1 and less than 65537; and at least one $r^{(c)}$ value is determined according to a UE RNTI, for example $r^{(0)} = 39827$, where, when the cell ID is an odd number, $r^{(1)} = 39827$; and when the cell ID is an even number, $r^{(1)} = 39829$, or the other way round.

502. Determine, according to the second offset parameter, a location offset of a search space corresponding to the EPDCCH set.

The location offset of the search space corresponding to the EPDCCH set is determined according to any one of the following equations:

$$Y_k^{(c)} = (r^{(c)} \cdot A \cdot Y_{k-1}^{(c)}) \bmod D \text{ or } Y_k^{(c)} = (A \cdot Y_{k-1}^{(c)} + r^{(c)}) \bmod D$$

where c is the number of the EPDCCH set, $Y_k^{(c)}$ is a location offset of a search space corresponding to the EPDCCH set whose number is c in the $k^{th}$ subframe, $Y_{-1} = n_{RNTI} \neq 0$, $k = \lfloor n_s/2 \rfloor$, $n_{RNTI}$ is a UE identifier, $n_s$ is a timeslot number, $A=39827$, $D=65537$, and $r^{(c)}$ is the second offset parameter.

503. Determine, according to a first location offset, a search space corresponding to a first EPDCCH set, and determine, according to a second location offset, a search space corresponding to a second EPDCCH set.

For a determining method, refer to step 205, and details are not described again.

Therefore, by grouping and numbering time frequency resources of EPDCCHs, and determining different location offsets for different EPDCCH search spaces according to the numbers and different cell identities or UE identifiers, the method for determining a control channel search space provided by the present disclosure can effectively reduce a probability of control channel search space conflict. Thereby, time frequency resources of control channels can be maximized in a case of multiple users, and communication efficiency can be improved.

Figure 6:
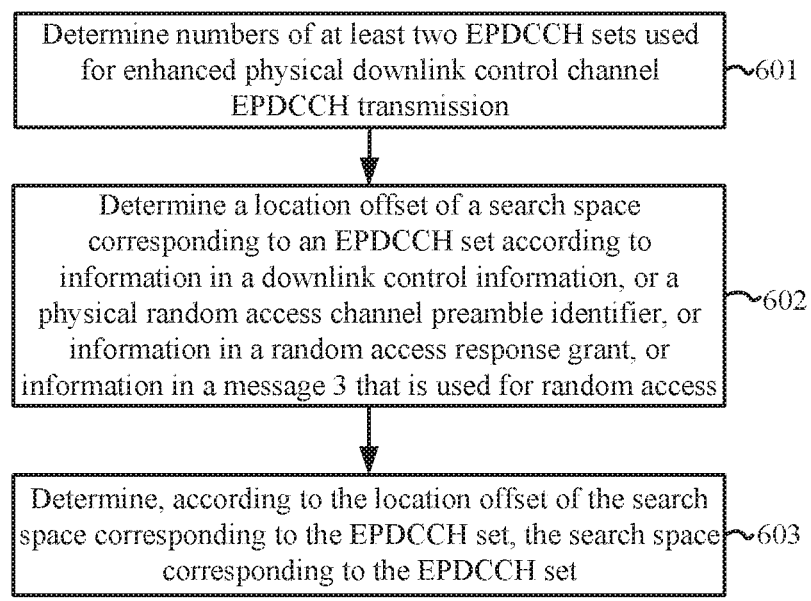
FIG. 6 is a schematic flowchart of a method for determining a search space according to another embodiment of the present disclosure.

FIG. 6 is a schematic flowchart of a method for determining a search space according to still another embodiment of the present disclosure. The method in FIG. 6 may be executed by a base station or a UE. FIG. 6 is a more specific embodiment of FIG. 1.

601. Determine numbers of EPDCCH sets used for enhanced physical downlink control channel EPDCCH transmission.

For a determining method, refer to step 101, and details are not described again.

602. Determine a location offset of a search space corresponding to an EPDCCH set according to information in downlink control information, or a physical random access channel preamble identifier, or information in random access response grant, or information in a message 3.

In this embodiment, for a common search space, a location offset of the common search space is determined by using any explicit or implicit message of a message 0 or message 1 or message 2 or message 3 during a physical random access channel PRACH process. Specifically, the location offset may be determined according to the following several manners:

by using the message 0, that is, DCI format 1A, any bit in the DCI format 1A may be used to indicate a location offset of a UE in the common search space;

by using the message 1, that is, a random access preamble index (PRACH preamble index), which location offset is used is determined; for example, an odd number corresponds to one location offset of the search space, and an even number corresponds to another location offset of the search space;

by using the message 2, that is, random access response grant (Random Access Response Grant), a location offset of the common search space of a UE is determined by adding a location offset indicator bit of the common search space;

by using the message 3, that is, after the message 2, a location offset indicator request bit of the common search space is added to information sent by a UE to an eNB, so as to determine a location offset of the common search space of the UE; and by using a radio network temporary identifier RNTI of a UE, a location offset of the UE in the common search space is determined, for example, an odd RNTI corresponds to one location offset of the search space, and an even RNTI corresponds to another location offset of the search space, where the RNTI includes but is not limited to a cell radio network temporary identifier (C-RNTI), a random access radio network temporary identifier (RA-RNTI), and a temporary cell radio network temporary identifier (Temporary C-RNTI).

603. Determine, according to the location offset of the search space corresponding to the EPDCCH set, the search space corresponding to the EPDCCH set.

For a determining method, refer to step 205, and details are not described again.

Therefore, by grouping and numbering time frequency resources of EPDCCHs, and determining different location offsets for different EPDCCH search spaces according to the numbers, different cell identities or UE identifiers, and different EPDCCH resource allocation modes and transmission modes, the method for determining a control channel search space provided by the present disclosure can effectively reduce a probability of control channel search space conflict. Thereby, time frequency resources of control channels can be maximized in a case of multiple users, and communication efficiency can be improved.

Figure 7:
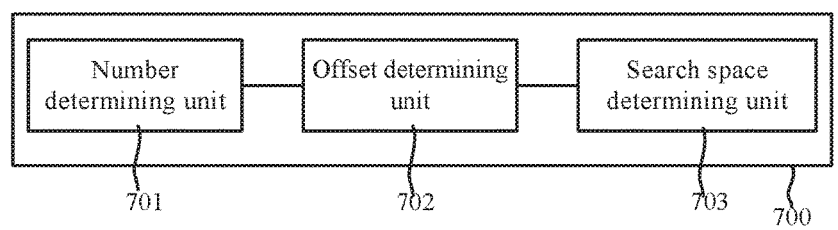
FIG. 7 is a schematic block diagram of an apparatus for determining a search space according to an embodiment of the present disclosure.

FIG. 7 is a schematic block diagram of an apparatus for determining a search space according to an embodiment of the present disclosure. As shown in FIG. 7, this embodiment provides an apparatus 700, which can specifically execute the steps in the foregoing embodiment in FIG. 1, and details are not described herein again. The apparatus 700 provided by this embodiment may specifically include a number determining unit 701, an offset determining unit 702, and a search space determining unit 703.

The number determining unit 701 is configured to determine numbers of at least two EPDCCH sets used for enhanced physical downlink control channel EPDCCH transmission.

The offset determining unit 702 is configured to determine, according to a number of the EPDCCH set, a location offset of a search space corresponding to the EPDCCH set.

The search space determining unit 703 is configured to determine, according to the location offset of the search space corresponding to the EPDCCH set, the search space corresponding to the EPDCCH set.

Figure 8:
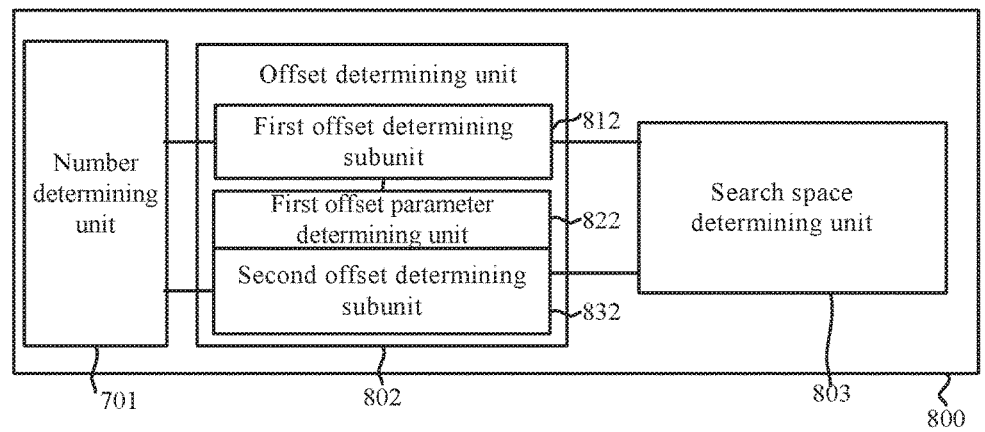
FIG. 8 is a schematic block diagram of an apparatus for determining a search space according to another embodiment of the present disclosure.

FIG. 8 is a schematic block diagram of an apparatus for determining a search space according to another embodiment of the present disclosure. As shown in FIG. 8, this embodiment provides an apparatus 800, which can specifically execute the steps in the foregoing embodiment in FIG. 2, and details are not described herein again. The apparatus 800 provided by this embodiment may specifically include a number determining unit 701, an offset determining unit 802, and a search space determining unit 803.

The offset determining unit 802 includes a first offset determining subunit 812, configured to determine, according to the first number, a first location offset of a search space corresponding to the first EPDCCH set; and a second offset determining subunit 832, configured to determine, according to the second number, a second location offset of a search space corresponding to the second EPDCCH set; and a first offset parameter determining unit 822, configured to determine a first offset parameter, where a specific determining method has been described in step 203 in the foregoing embodiment in FIG. 2, and details are not described herein again.

The first offset parameter determining unit 822 may include a subunit that is in the second offset determining subunit 832 or independent of the second offset determining subunit 832.

The search space determining unit 803 is configured to determine, according to the first location offset, the search space corresponding to the first EPDCCH set, and determine, according to the second location offset, the search space corresponding to the second EPDCCH set.

Figure 9:
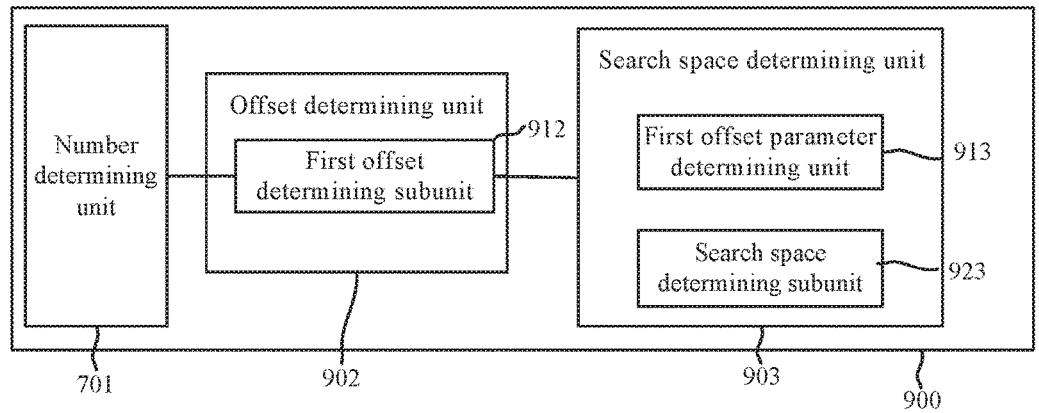
FIG. 9 is a schematic block diagram of an apparatus for determining a search space according to another embodiment of the present disclosure.

FIG. 9 is a schematic block diagram of an apparatus for determining a search space according to another embodiment of the present disclosure. As shown in FIG. 9, this embodiment provides an apparatus 900, which can specifically execute the steps in the foregoing embodiment in FIG. 3, and details are not described herein again. The apparatus 900 provided by this embodiment may specifically include a number determining unit 701, an offset determining unit 902, and a search space determining unit 903, where:

the offset determining unit 902 includes a first offset determining subunit 912, configured to determine, according to the first number, a first location offset of a search space corresponding to the first EPDCCH set; and the search space determining unit 903 includes: a first offset parameter determining unit 913 and a search space determining subunit 923.

The first offset parameter determining unit 913 is configured to determine a first offset parameter, where a specific determining method has been described in step 203 in the foregoing embodiment in FIG. 2, and details are not described herein again. The search space determining subunit 923 is configured to determine, according to the first location offset and the first offset parameter, a search space corresponding to a second EPDCCH set.

Figure 10:
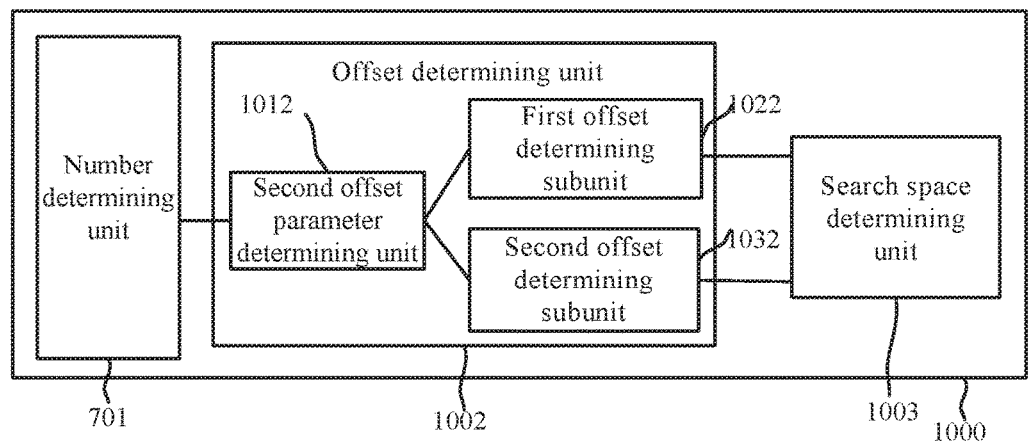
FIG. 10 is a schematic block diagram of an apparatus for determining a search space according to another embodiment of the present disclosure.

FIG. 10 is a schematic block diagram of an apparatus for determining a search space according to another embodiment of the present disclosure. As shown in FIG. 10, this embodiment provides an apparatus 1000, which can specifically execute the steps in the foregoing embodiment in FIG. 3 or FIG. 4, and details are not described herein again. The apparatus 1000 provided by this embodiment may specifically include a number determining unit 701, an offset determining unit 1002, and a search space determining unit 1003.

The offset determining unit 1002 includes a second offset parameter determining unit 1012, a first offset determining subunit 1022, and a second offset determining subunit 1023.

The second offset parameter determining unit 1012 is configured to determine a first parameter $A^{(c)}$ or a second parameter $D^{(c)}$ or a second of f set parameter $r^{(c)}$ according to a number of the EPDCCH set, where a specific determining method has been described in step 401 of the embodiment in FIG. 4 and step 501 of the embodiment in FIG. 5, and details are not described herein again.

The search space determining unit 1003 is configured to determine, according to the first location offset, a search space corresponding to a first EPDCCH set, and determine, according to the second location offset, a search space corresponding to a second EPDCCH set.

Therefore, by grouping and numbering time frequency resources of EPDCCHs, and determining different location offsets for different EPDCCH search spaces according to the numbers, different cell identities or UE identifiers, and different EPDCCH resource allocation modes and transmission modes, the apparatus for determining a control channel search space provided by the present disclosure can effectively reduce a probability of control channel search space conflict. Thereby, time frequency resources of control channels can be maximized in a case of multiple users, and communication efficiency can be improved.

Figure 11:
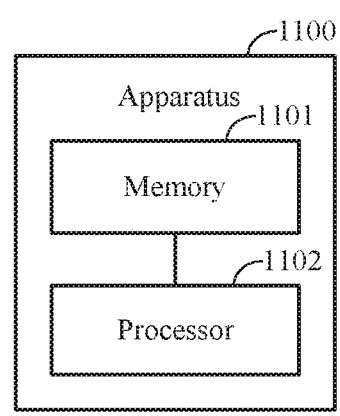
FIG. 11 is a schematic block diagram of an apparatus for determining a search space according to another embodiment of the present disclosure.

FIG. 11 is a schematic block diagram of an apparatus for determining a search space according to another embodiment of the present disclosure. As shown in FIG. 11, this embodiment provides an apparatus 1100, which can specifically execute the steps of any one of the foregoing embodiments, and details are not described herein again. The apparatus 1100 provided by this embodiment may specifically include a memory 1101 and a processor 1102.

The memory 1101 may be configured to store numbers of EPDCCH sets used for enhanced physical downlink control channel EPDCCH transmission, determine, according to a number of the EPDCCH set, a location offset of a search space corresponding to the EPDCCH set, and determine, according to the location offset of the search space corresponding to the EPDCCH set, code that is required by the search space corresponding to the EPDCCH set.

The memory 1101 may further be configured to store the numbers of EPDCCH sets, a first offset parameter, a second offset parameter, a first parameter, a second parameter, a location offset of a search space corresponding to an EPDCCH set and the search space corresponding to the EPDCCH set, so that the processor stores to-be-processed data and to-be-output data and temporarily stores intermediate data.

The memory 1101 may either be a memory that is independent of the processor 1102, or be a cache that is included in the processor 1102.

The processor 1102 is configured to execute the code in the memory 1101, so as to determine a number of an EPDCCH set used for enhanced physical downlink control channel EPDCCH transmission, determine, according to the number of the EPDCCH set, a location offset of a search space corresponding to the EPDCCH set, and determine, according to the location offset of the search space corresponding to the EPDCCH set, the search space corresponding to the EPDCCH set.

The processor 1102 may further be configured to determine a first offset parameter, a second offset parameter, a first parameter, and a second parameter. For a determining method of the first offset parameter, refer to step 203 in the foregoing embodiment in FIG. 2; for a determining method of the second offset parameter, refer to step 501 in the foregoing embodiment in FIG. 5; and for determining methods of the first parameter and the second parameter, refer to step 401 in the foregoing embodiment in FIG. 4.

Therefore, by grouping and numbering time frequency resources of EPDCCHs, and determining different location offsets for different EPDCCH search spaces according to the numbers, different cell identities or UE identifiers, and different EPDCCH resource allocation modes and transmission modes, the apparatus for determining a control channel search space provided by the present disclosure can effectively reduce a probability of control channel search space conflict. Thereby, time frequency resources of control channels can be maximized in a case of multiple users, and communication efficiency can be improved.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for determining a control channel search space at a communication device in a wireless communication system, the method comprising:
   determining a number of a physical resource set of at least two physical resource sets;
   determining, according to the numbers of the physical resource set, a location offset; and
   determining, according to the location offset, a search space corresponding to the at least two physical resource set;
   wherein the location offset of the search space corresponding to the physical resource set satisfies:

$Y_k^{(c)}=(A^{(c)} \cdot Y_{k-1}^{(c)}) \mod 65537$;

wherein c is the number of the physical resource set, $Y_k^{(c)}$ is the location offset of the search space corresponding to the physical resource set in a $k^{th}$ timelength, $Y_{-1}=n_{RNTI} \neq 0$, , $n_{RNTI}$ is an identifier of a user equipment, and the $k^{th}$ timelength comprises 12 or 14 orthogonal frequency division multiplexing (OFDM) symbols;
   when c=0, $A^{(0)}=39827$; and
   when c=1, $A^{(1)}=39829$.

2. The method according to claim 1, wherein when c is another number, $A^{(c)}$ is one of the following values:
   39671, 39679, 39703, 39709, 39719, 39727, 39733, 39749, 39761, 39769, 39779, 39791, 39799, 39821, 39839, 39841, 39847, 39857, 39863, 39869, 39877, 39883, 39887, 39901, 39929, 39937, 39953, 39971, 39979, 39983, and 39989.

3. The method according to claim 1, wherein $A^{(c)}$ is determined based on a cell identifier or the identifier of the user equipment.

4. A communication device in a wireless communication system, the communication device comprising:
   a memory; and
   a processing circuit coupled with the memory, wherein the processing circuit is configured to:
   determine a number of a physical resource set of at least two physical resource sets;
   determine, according to the number of the physical resource set, a location offset;
   determine, according to the location offset, a search space corresponding to the physical resource set;
   wherein the location offset of the search space corresponding to the physical resource set satisfies:

$Y_k^{(c)}=(A^{(c)} \cdot Y_{k-1}^{(c)}) \mod 65537$;

wherein c is the number of the physical resource set, $Y_k^{(c)}$ is the location offset of the search space corresponding to the physical resource set in a $k^{th}$ timelength, $Y_{-1}=n_{RNTI} \neq 0$, $n_{RNTI}$ is an identifier of a user equipment, and the $k^{th}$ timelength comprises 12 or 14 orthogonal frequency division multiplexing (OFDM) symbols;
   when c=0, $A^{(0)}=39827$; and
   when c=1, $A^{(1)}=39829$.

5. The device according to claim 4, wherein when c is another number, $A^{(c)}$ is one of the following values:
   39671, 39679, 39703, 39709, 39719, 39727, 39733, 39749, 39761, 39769, 39779, 39791, 39799, 39821, 39839, 39841, 39847, 39857, 39863, 39869, 39877, 39883, 39887, 39901, 39929, 39937, 39953, 39971, 39979, 39983, and 39989.

6. The device according to claim 4, wherein $A^{(c)}$ is determined based on a cell identifier or the identifier of the user equipment.

7. A non-transitory computer-readable storage medium, storing programming instructions for execution by a processor in a wireless communication system, wherein the programming instructions instruct the processor to:
   determine a number of a physical resource set of at least two physical resource sets;
   determine, according to the number of the physical resource set, a location offset;
   determine, according to the location offset, a search space corresponding to the physical resource set;
   wherein the location offset of the search space corresponding to the physical resource set satisfies:

$Y_k^{(c)}=(A^{(c)} \cdot Y_{k-1}^{(c)}) \mod 65537$;

wherein c is the number of the physical resource set, $Y_k^{(c)}$ is the location offset of the search space corresponding to the physical resource set in a $k^{th}$ timelength, $Y_{-1}=n_{RNTI} \neq 0$, $n_{RNTI}$ is an identifier of a user equipment, and the $k^{th}$ timelength comprises 12 or 14 orthogonal frequency division multiplexing (OFDM) symbols;
   when c=0, $A^{(0)}=39827$; and
   when c=1, $A^{(1)}=39829$.

8. The medium according to claim 7, wherein when c is another number, $A^{(c)}$ is one of the following values:
   39671, 39679, 39703, 39709, 39719, 39727, 39733, 39749, 39761, 39769, 39779, 39791, 39799, 39821, 39839, 39841, 39847, 39857, 39863, 39869, 39877, 39883, 39887, 39901, 39929, 39937, 39953, 39971, 39979, 39983, and 39989.

9. The medium according to claim 7, wherein $A^{(c)}$ is determined based on a cell identifier or the identifier of the user equipment.

* * * * *

UNITED STATES PATENT AND TRADEMARK OFFICE
CERTIFICATE OF CORRECTION

PATENT NO. : 10,306,628 B2
APPLICATION NO. : 15/624664
DATED : May 28, 2019
INVENTOR(S) : Zhenfei Tang Page 1 of 1

It is certified that error appears in the above-identified patent and that said Letters Patent is hereby corrected as shown below:

In the Claims

Column 21, Claim 1, Line 25, delete "kth";
Column 21, Claim 1, Lines 25-26, after "timelength" insert -- k --;
Column 21, Claim 1, Line 27, delete "kth";
Column 21, Claim 1, Line 27, after "timelength" insert -- k --;
Column 22, Claim 4, Line 6, delete "kth";
Column 22, Claim 4, Lines 6-7, after "timelength" insert -- k --;
Column 22, Claim 4, Line 8, delete "kth";
Column 22, Claim 4, Line 8, after "timelength" insert -- k --;
Column 22, Claim 7, Line 38, delete "kth";
Column 22, Claim 7, Line 38, after "timelength" insert -- k --;
Column 22, Claim 7, Line 40, delete "kth"; and
Column 22, Claim 7, Line 40, after "timelength" insert -- k --.

Signed and Sealed this
Ninth Day of July, 2019

Andrei Iancu
*Director of the United States Patent and Trademark Office*